(12) United States Patent
Ramsteiner et al.

(10) Patent No.: US 10,901,071 B2
(45) Date of Patent: Jan. 26, 2021

(54) DEVICE AND METHOD FOR MANUFACTURING A DEVICE

(71) Applicant: Robert Bosch GmbH, Stuttgart (DE)

(72) Inventors: Ingo Ramsteiner, Leonberg (DE); Annemarie Holleczek, Stuttgart (DE); Hans-Jochen Schwarz, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/551,976

(22) Filed: Aug. 27, 2019

(65) Prior Publication Data

US 2020/0072945 A1 Mar. 5, 2020

(30) Foreign Application Priority Data

Aug. 29, 2018 (DE) .......................... 10 2018 214 581

(51) Int. Cl.
- *G01S 7/481* (2006.01)
- *G01S 17/89* (2020.01)

(52) U.S. Cl.
CPC .............. *G01S 7/481* (2013.01); *G01S 17/89* (2013.01)

(58) Field of Classification Search
CPC .......... G01S 7/481; G01S 17/89; G01S 17/88; G01S 7/4813; G01S 17/931; G01C 3/02; G01J 5/004
See application file for complete search history.

(56) References Cited

U.S. PATENT DOCUMENTS

| 5,405,680 A * | 4/1995 | Chang | C03C 17/22 428/212 |
| 2010/0155043 A1* | 6/2010 | Smith | C09K 5/14 165/185 |
| 2011/0042052 A1* | 2/2011 | Smith | G02B 5/22 165/185 |
| 2017/0254503 A1* | 9/2017 | Gasworth | F21S 41/25 |
| 2019/0086164 A1* | 3/2019 | Yang | F28D 20/00 |
| 2019/0116297 A1* | 4/2019 | Youmans | F21V 29/773 |
| 2019/0179028 A1* | 6/2019 | Pacala | G01S 17/89 |

FOREIGN PATENT DOCUMENTS

| WO | WO-2008154691 A1 * | 12/2008 | ............. B28Y 20/00 |
| WO | WO-2019030106 A1 * | 2/2019 | ........... G01S 7/4813 |

OTHER PUBLICATIONS

Mikron—Table of Emissivity of Various Surfaces (http://www-eng.lbl.gov/~dw/projects/DW4229_LHC_detector_analysis/calculations/; Aug. 14, 2003) (Year: 2003).*

* cited by examiner

*Primary Examiner* — Maria E Vazquez Colon
(74) *Attorney, Agent, or Firm* — Norton Rose Fulbright US LLP; Gerard Messina

(57) ABSTRACT

A device in the form of a sensor, including a housing having a surface which includes at least one subarea having a spectral emissivity which includes a first emissivity in a first wavelength range and a second emissivity in a second wavelength range, which is different from the first wavelength range, the first emissivity being smaller than the second emissivity and the ratio of the second emissivity to the first emissivity being at least 1.5.

14 Claims, 3 Drawing Sheets

DEVICE AND METHOD FOR MANUFACTURING A DEVICE

CROSS REFERENCE

The present application claims the benefit under 35 U.S.C. § 119 of German Patent Application No. DE 102018214581.4 filed on Aug. 29, 2018, which is expressly incorporated herein by reference in its entirety.

FIELD

The present invention relates to a device, in particular in the form of a sensor. The present invention further relates to a method for manufacturing a device, in particular in the form of a sensor. The present invention further relates to a vehicle including a device, in particular in the form of a sensor.

BACKGROUND INFORMATION

Although the present invention is applicable in general to any arbitrary device, the present invention is described with relation to devices in the form of LIDAR sensors for vehicles.

In the field of sensor systems, LIDAR in particular has become used for detecting the surroundings with a broad field of vision. For this purpose, it may be naturally necessary to situate a sensor of this type on the roof of a vehicle in a protruding manner, so that the roof does not limit it field of vision. For this purpose, a rotating or static housing is mounted, for example, at the highest point of the body of the vehicle to allow for an unobstructed all-around vision. When the sensor is mounted on the roof of the vehicle, it may heat up in particular at a standstill of the vehicle, i.e., without a cooling airflow.

SUMMARY

In one specific embodiment, the present invention provides a device, in particular in the form of a sensor, including a housing having a surface which includes at least one subarea having a spectral emissivity which includes a first emissivity in a first wavelength range and a second emissivity in a second wavelength range, which is different from the first wavelength range, the first emissivity being smaller than the second emissivity and the ratio of the second emissivity to the first emissivity being at least 1.5.

In another specific embodiment, the present invention provides a method for manufacturing a device, in particular in the form of a sensor, including the steps:
providing a housing for the device, and
manufacturing a surface for the housing in such a way that in at least one subarea it has a spectral emissivity which includes a first emissivity in a first wavelength range and a second emissivity in a second wavelength range, which is different from the first wavelength range, the first emissivity being smaller than the second emissivity and the ratio of the second emissivity to the first emissivity being at least 1.5.

In another specific embodiment, the present invention provides a vehicle including the above-described device.

One of the advantages achieved thereby is that a heating of the device may be limited or even avoided with the aid of radiation cooling. Here, the fact is utilized in particular that the housing of the device is designed to be strongly reflective due to a corresponding emissivity within a first wavelength range, in particular within the wavelength range of the solar radiation, and thus a preferably low energy input takes place. Moreover, an excessively high emissivity is provided in a second wavelength range, so that the device outputs a preferably great deal of thermal radiation. In this way, an outgoing net thermal radiation flux is provided overall that is greater than the incoming thermal radiation flux, so that a heating is avoided.

Further features, advantages, and further specific embodiments of the present invention are described in the following or provided as a result thereof.

According to one advantageous refinement, the ratio is at least 2, preferably at least 3, in particular at least 4.5, preferably at least 6. This makes a higher thermal emission than thermal absorption possible in a suitable manner.

According to another advantageous refinement, the first emissivity is smaller than 0.3, preferably smaller than 0.2, in particular smaller than 0.15 and/or the second emissivity is greater than 0.75, in particular greater than 0.8, preferably greater than 0.9, in particular greater than 0.95. The thermal radiation input and the emission of heat are thus further optimized.

According to another advantageous refinement, the first wavelength range is formed by the range from 0 nm to 5,000 nm, preferably from 300 nm to 2,500 nm, in particular from 400 nm to 1,200 nm and/or the second wavelength range is formed by the range from 5,000 nm to 20,000 nm, preferably from 8,000 nm to 14,000 nm. One of the advantages thus achieved is that a preferably low thermal energy input onto or into the device thus takes place in particular as a result of solar irradiation, and at the same time, heat emission takes place within a range, in which a low thermal energy input occurs as a result of solar irradiation.

According to another advantageous refinement, the at least one subarea is orientable in parallel to the Earth's surface. By orienting the at least one subarea in parallel to the Earth's surface, it is possible to emit heat perpendicularly upward into to the sky, thus further improving the heat emission.

According to another advantageous refinement, the housing includes in the at least one subarea $SiO_2$ and $HfO_2$ and/or an arrangement of glass balls embedded in a polymer, in particular polymethylpentene, and a reflective silver layer being situated on the side of the polymer facing the inner surface of the device. In this way, in particular with the aid of a layer system made of $SiO_2$ and $HfO_2$, a cooling below the ambient temperature may be made possible.

According to another advantageous refinement, the housing includes in the at least one subarea a metal, to which an arrangement of glass balls embedded in a polymer, in particular polymethylpentene, is applied. A simple integration on a housing made of metal is thus possible. In this case, the metal layer is then used as the reflective layer.

According to another advantageous refinement, the device is designed as a LIDAR sensor. In this way, a passively cooled LIDAR device is in particular made available.

According to another advantageous refinement of the method, the housing is provided in the at least one subarea with a metal layer, to which an arrangement of glass balls embedded in a polymer, in particular polymethylpentene, is applied. A simple arrangement on a housing made of metal is thus possible. In this case, the metal layer is used as the reflective layer.

Further important features and advantages of the present invention are described herein and are shown in the figures.

It is understood that the above-mentioned features and the features to be elucidated below are usable not only in the given combination, but also in other combinations or alone without departing from the scope of the present invention.

Preferred embodiments and specific embodiments of the present invention are illustrated in the figures and are elucidated in greater detail in the description below, identical reference numerals referring to identical or similar or functionally identical components or elements.

DETAILED DESCRIPTION OF EXAMPLE EMBODIMENTS

Figure 1:
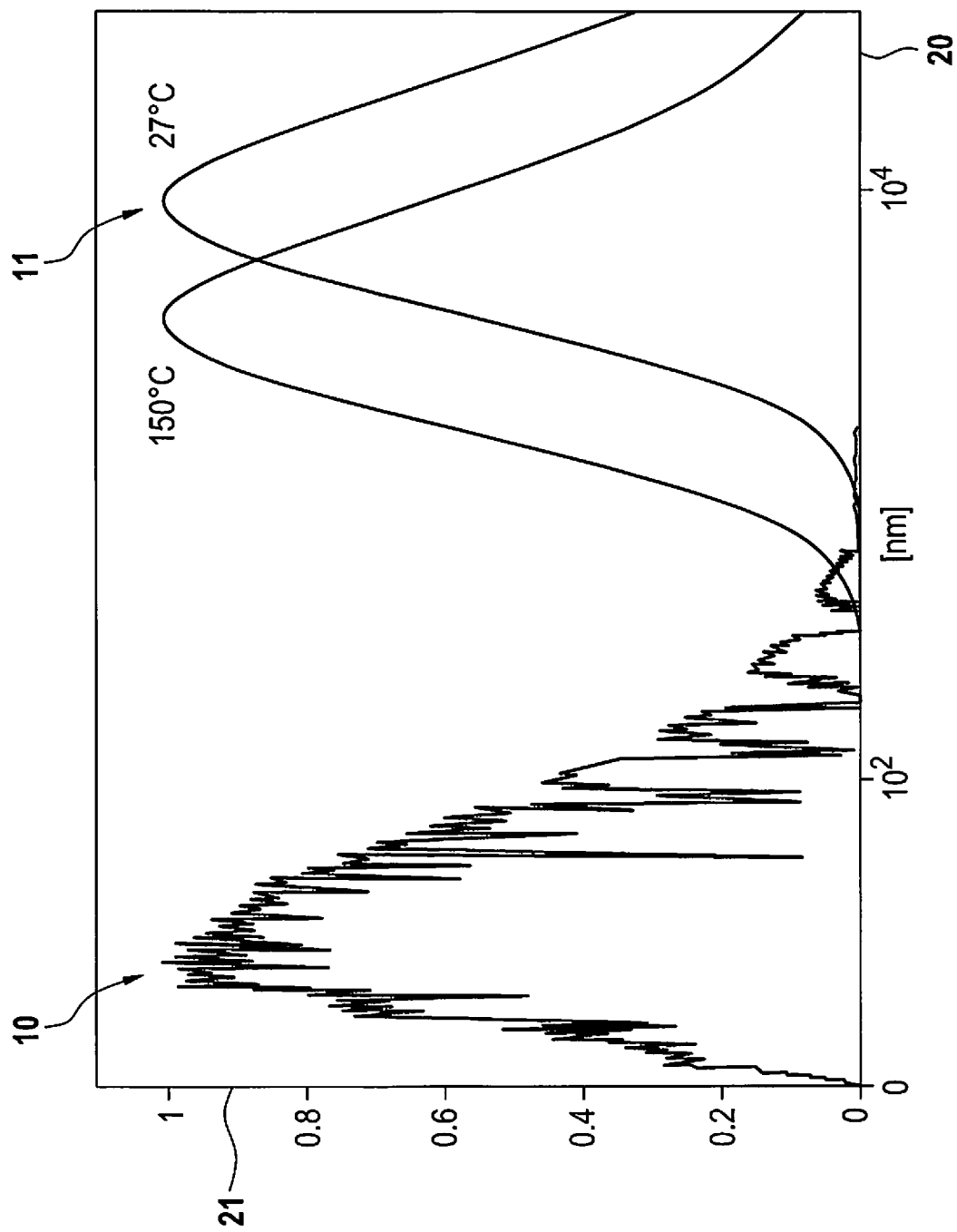
FIG. 1 shows a comparison between the atmospheric solar spectrum and a black-body radiation in the case of two different temperatures.

FIG. 1 shows a comparison between the atmospheric solar spectrum and a black-body radiation in the case of two different temperatures. In this case, wavelength 20 is plotted in nanometers over corresponding intensity 21 in any arbitrary unit.

Figure 2:
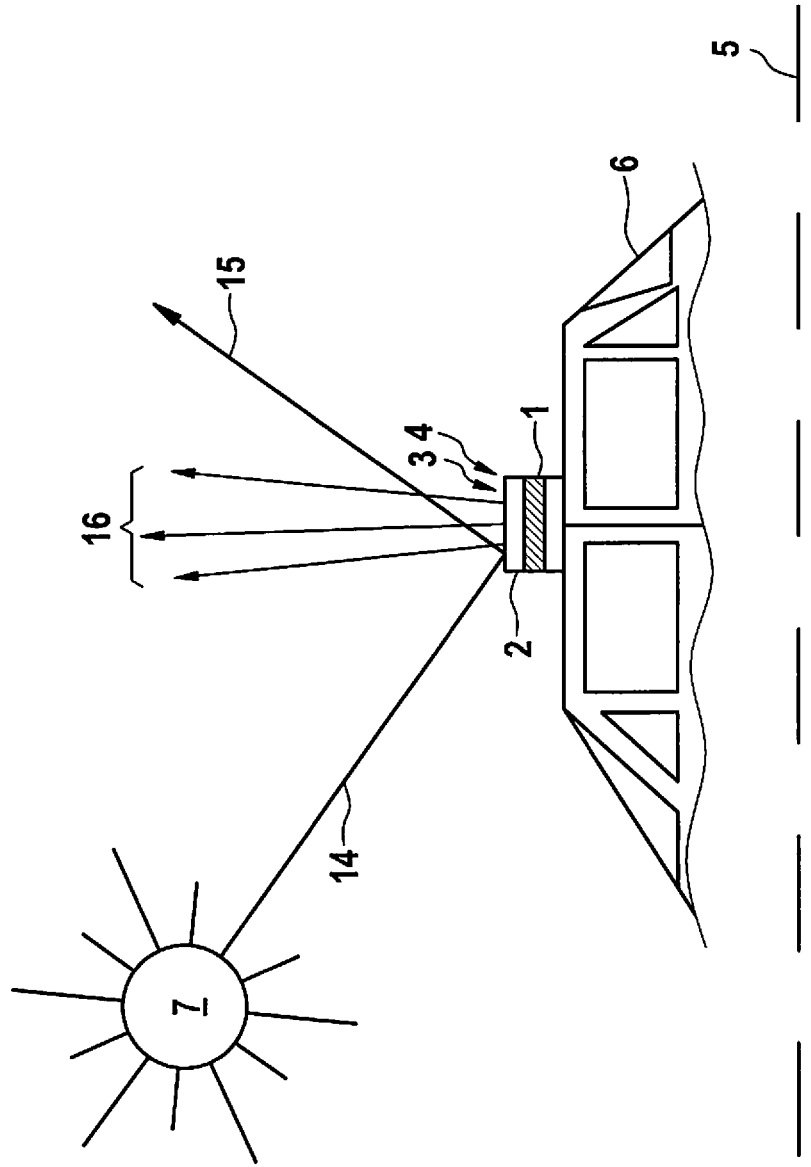
FIG. 2 shows a vehicle including a device according to one specific embodiment of the present invention.

FIG. 2 shows a vehicle including a device according to one specific embodiment of the present invention.

In detail, spectrum 10 of the sun corresponds approximately to a 5,900 K hot black radiator. When passing through the atmosphere, it loses the majority of its short-wave portions (UV), some near-infrared bands and is attenuated overall due to absorption and scattering. The radiation hitting the Earth's surface essentially contains light in the visible or near-infrared range and thus essentially covers wavelengths between 300 nm and 2,500 nm, only even smaller portions prevailing above 1,200 nm. The radiation power, integrated across all wavelengths, depends on the degree of latitude, the solar altitude, and the weather conditions, and may amount to 1,050 W/m$^2$ in the extreme case: solar zenith, clean, dry atmosphere. The thermal radiation of an ideally black body strongly depends on its temperature T. In the case of a room temperature of 27° C., the spectral maximum is at approximately 10 µm, shifting toward shorter wavelengths at approximately 6 µm at 150° C. in the case of a hotter body.

In the case of real objects, absorption and emission of radiation are to be weighted using degree of absorption $\alpha(\lambda)$ or emissivity $\varepsilon(\lambda)$, respectively. According to Kirchhoff's law of radiation, the directed spectral degree of absorption is essentially equal to the directed spectral emissivity for each body, emissivity $\varepsilon$ being a function of the wavelength of the radiation. This is equally true for the degree of absorption, so that reference is only made to the emissivity in the following.

FIG. 2 now shows a vehicle 6 on whose roof a LIDAR sensor 1 is situated. The latter includes a housing 2 that has a surface 3 including at least one subarea 4 designed according to the present invention. In the range of the solar spectrum, in particular in the case of a wavelength $\lambda$ between 300 nm and 2500 nm, in particular between 400 nm and 1200 nm, this subarea 4 has a preferably low emissivity/absorption, in particular $\varepsilon<0.3$, preferably $\varepsilon<0.2$, particularly preferably $\varepsilon<0.15$, while the thermal emissivity, i.e. $\varepsilon$, is preferably high in particular within wavelength range $\lambda$ between 8 µm and 14 µm, in particular $\varepsilon>0.8$, preferably $\varepsilon>0.9$, particularly preferably $\varepsilon>0.95$.

As is shown in FIG. 2, this results in that sunlight 14 of sun 7—whether directly from sun 7 or indirectly through scattering in the atmosphere—is largely reflected (reference numeral 15) from subarea 4 and housing 2 of sensor 1, which is covered by subarea 4, is heated up only slightly. In the area of thermal radiation, energy is intensively emitted, i.e., more and more with increasing housing temperature according to the T$^4$ relation. Although great emission also means great absorption, there is open sky above subarea 4 situated in parallel to Earth's surface 5. Although the atmosphere is also there, it shows, particularly within wavelength range $\lambda$ between 8 µm and 14 µm, hardly any absorption and therefore also hardly any emission. In this spectral range, which is also referred to as the "atmospheric window," the atmosphere is essentially permeable. In other words, sensor 1 provided with the at least one subarea surface is in radiative equilibrium with outer space, which may be described as a black emitter having approximately 4 K, i.e., −270° C.

The at least one subarea 4 may be designed to have or provided with
  a layer system including SiO$_2$ and HfO$_2$, which makes cooling by up to 5° C. below the ambient temperature possible,
  a plurality of artificial setae having a triangular cross section, emulating the setae of the ant genus *Cataglyphis bombycina* and/or
  an arrangement made of 8 µm sized little glass balls in a polymer layer, in particular made of polymethylpentene, having a one-sided silver film. While the silver film is reflecting the sunlight, the above-named arrangement is an IR emitter having a maximum of $\varepsilon(\lambda)$ at $\lambda=70$ µm, which makes a cooling by up to 10° C. possible.

In one alternative specific embodiment, the above-described 8 µm sized little glass balls may also be embedded into a transparent matrix, the latter then not being designed as a foil and coated with silver, but being applied directly to a smooth metal, for example a correspondingly designed sensor housing. The metallic substrate then takes over the reflector function of the above-described silver layer.

Figure 3:
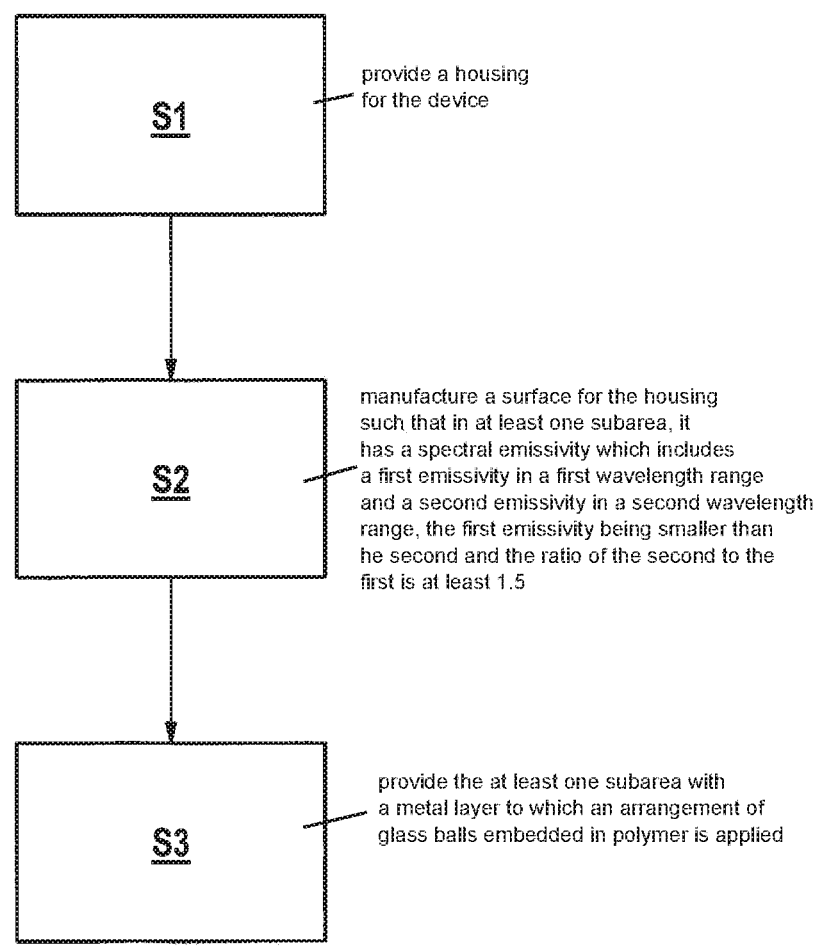
FIG. 3 shows steps of a method according to one specific embodiment of the present invention.

FIG. 3 shows steps of a method according to one specific embodiment of the present invention.

FIG. 3 shows a method for manufacturing a device, in particular in the form of a sensor.

In a first step S1, it includes providing a housing for the device.

In a further step S2, it further includes manufacturing a surface for the housing in such a way that in at least one subarea it has a spectral emissivity which includes a first emissivity in a first wavelength range and a second emissivity in a second wavelength range, which is different from the first wavelength range, the first emissivity being smaller than the second emissivity and the ratio of the second emissivity to the first emissivity being at least 1.5.

It includes in a further step S3 that the housing is provided in the at least one subarea with a metal layer, to which an arrangement of glass balls embedded in a polymer, in particular polymethylpentene, is applied.

To sum up, at least one of the specific embodiments yields at least one of the following advantages:
  good cooling.
  passive cooling.
  no additional active cooling necessary.
  robustness.

Although the present invention has been described on the basis of preferred exemplary embodiments, it is not limited thereto, but may be modified in multiple ways.

What is claimed is:

1. A device, comprising:
   a sensor;
   wherein the sensor includes a housing having a surface which includes at least one subarea having a spectral emissivity which includes a first emissivity in a first wavelength range and a second emissivity in a second wavelength range, which is different from the first wavelength range, and wherein the first emissivity is smaller than the second emissivity and wherein a ratio of the second emissivity to the first emissivity is at least 1.5, and
   wherein the housing includes in the at least one subarea, a metal, to which an arrangement of glass balls embedded in a polymer is applied.

2. The device as recited in claim 1, wherein the ratio is at least 2, or at least 3, or at least 4.5, or at least 6.

3. The device as recited in claim 1, wherein the first emissivity is smaller than 0.3, or smaller than 0.2, or smaller than 0.15.

4. The device as recited in claim 1, wherein the second emissivity is greater than 0.75, or greater than 0.8, or greater than 0.9, or greater than 0.95.

5. The device as recited in claim 1, wherein the first wavelength range is in a range from 0 nm to 5,000 nm, or from 300 nm to 2,500 nm, or from 400 nm to 1,200 nm.

6. The device as recited in claim 1, wherein the second wavelength is in a range from 5,000 nm to 20,000 nm, or from 8,000 nm to 14,000 nm.

7. The device as recited in claim 1, wherein the at least one subarea is orientable in parallel to the Earth's surface.

8. The device as recited in claim 1, wherein: (i) the housing includes in the at least one subarea $SiO_2$ and $HfO_2$, and/or (ii) an arrangement of glass balls embedded in a polymer, and a reflective silver layer is situated on the side of the polymer facing the inner surface of the device.

9. The device as recited in claim 8, wherein the polymer is polymethylpentene.

10. The device as recited in claim 1, wherein the polymer is polymethylpentene.

11. The device as recited in claim 1, wherein the sensor is a LIDAR sensor.

12. A method for manufacturing a device including a sensor, comprising:
    providing a housing for the device, the device including the sensor;
    manufacturing a surface for the housing so that in at least one subarea, the housing has a spectral emissivity which includes a first emissivity in a first wavelength range and a second emissivity in a second wavelength range, which is different from the first wavelength range, wherein the first emissivity is smaller than the second emissivity and wherein the ratio of the second emissivity to the first emissivity is at least 1.5; and
    providing the housing, in the at least one subarea, with a metal layer, to which an arrangement of glass balls embedded in a polymer is applied.

13. The method as recited in claim 12, wherein the polymer is polymethylpentene.

14. A vehicle, comprising:
    a device having a sensor;
    wherein the sensor includes a housing having a surface which includes at least one subarea having a spectral emissivity which includes a first emissivity in a first wavelength range and a second emissivity in a second wavelength range, which is different from the first wavelength range, wherein the first emissivity is smaller than the second emissivity and wherein a ratio of the second emissivity to the first emissivity is at least 1.5, and
    wherein the housing includes in the at least one subarea, a metal, to which an arrangement of glass balls embedded in a polymer is applied.

* * * * *